May 11, 1954           F. W. HARRIS           2,678,339

PROCESS OF PRODUCING GASES BY PYROLYSIS

Filed May 5, 1951           2 Sheets-Sheet 1

INVENTOR.
FORD W. HARRIS
BY HIS ATTORNEYS.
HARRIS, KIECH, FOSTER & HARRIS

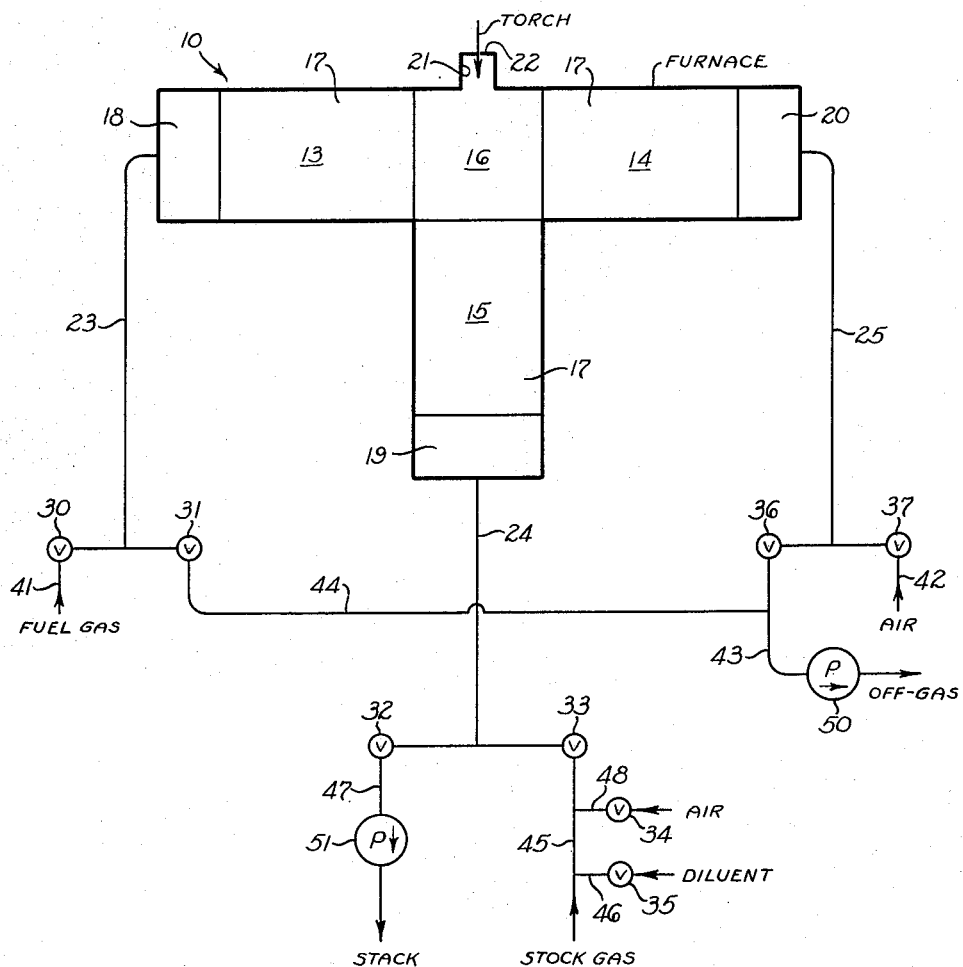

Patented May 11, 1954

2,678,339

UNITED STATES PATENT OFFICE 2,678,339

PROCESS OF PRODUCING GASES BY PYROLYSIS

Ford W. Harris, Los Angeles, Calif., assignor to Wulff Process Company, Huntington Park, Calif., a corporation of California Application May 5, 1951, Serial No. 224,795

2 Claims. (Cl. 260—679)

My invention relates to the pyrolysis of gases and it is an object of my invention to provide a novel furnace in which a novel process may be conducted.

A general statement as to the utility and novelty of the furnace is as follows:

(a) The furnace consists of a gas-tight shell having the general form of the letter T, the shell having a heat refractory and insulating lining. Three regenerative masses, each consisting of heat refractory material, are placed inside the lining, the two top masses being placed on either side of the vertical axis of the T in the top bar thereof and the other central mass being placed below the bar in the vertical portion of the T.

(b) The furnace has a central combustion space above the central mass and between the top masses.

(c) The furnace has three end spaces each situated at the outer end of one of the three masses, each end space communicating through open channels in its associated mass with said central combustion space.

(d) Each of the end spaces has an end pipe through which gas may be withdrawn from or introduced into the end space.

The process is a cyclic one in which an off-gas containing a substantial proportion of acetylene is formed by the pyrolysis of an in-gas containing a substantial proportion of a suitable hydrocarbon. The word "pyrolysis" is used in its common, or dictionary, sense as meaning any method of causing chemical changes by the application of heat. The term "in-gas" denotes any gas or mixture of gases which is to be subjected to pyrolysis, and the term "off-gas" denotes any gas that has been so subjected to pyrolysis. A "substantial proportion" of any specific gas in a mixture of gases means a proportion of at least two per cent (2%) by weight of the specific gas. The term "suitable hydrocarbon" includes all hydrocarbons known to the art at the time this application was filed as suitable for the production of acetylene by pyrolysis. Methane and the olefins which are gaseous at atmospheric temperature and pressure, natural gas, natural gasoline, and many other hydrocarbons were so known.

A general statement as to the utility and novelty of the process is as follows:

(e) The process is a cyclic one, the recurring cycle consisting of a heat step followed by a make step. During the heat step gas and air are separately heated to combustion temperature and then allowed to burn to form products of combustion, said products of combustion being thereafter passed through channels in a regenerative mass until a portion of said mass is at a temperature substantially above the reaction temperature of the pyrolysis;

(f) Thereafter during the make step an in-gas is passed through said channels in said mass, in a direction opposite to that of the flow in the heat step, said flow of in-gas being discontinued before the hottest portion of said mass falls below said reaction temperature.

(g) The heat required for heating said air and gas during the heat step is supplied by regeneration of heat extracted from the off-gas during the make step.

More specific statements as to the novelty and utility of the furnace and process will appear in the following specification.

In the drawings, which are for illustrative purposes only:

Fig. 4 is a diagram of pipe connections.

Figure 1:
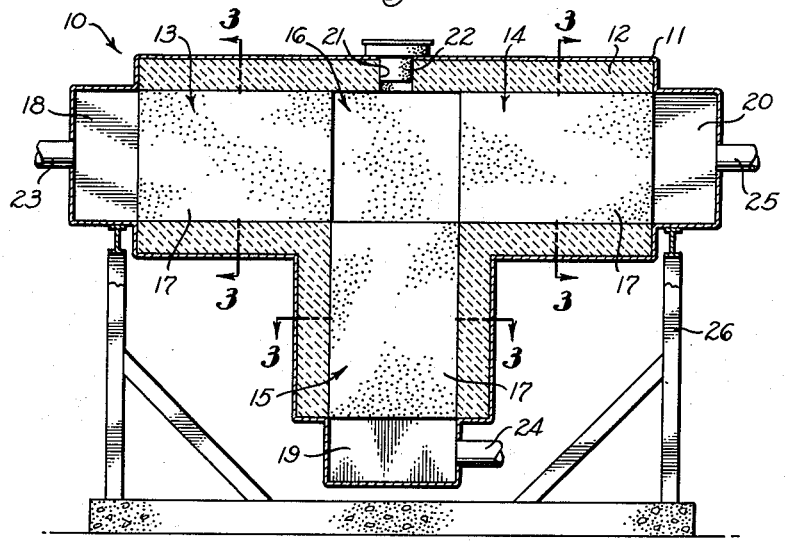
Fig. 1 is a vertical central section, on a plane indicated by the line 1—1 of Fig. 2, of a furnace embodying my invention.
Figure 2:
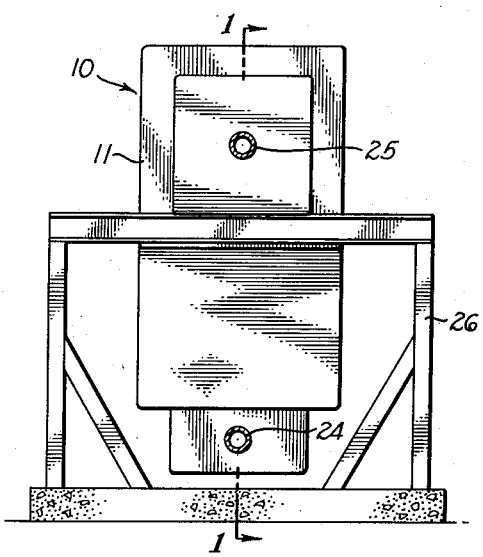
Fig. 2 is an end view of the furnace.
Figure 3:
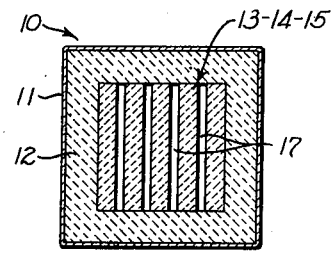
Fig. 3 is a section which is identical on all three planes indicated by the lines 3—3 of Fig. 1.

The furnace 10 illustrated in these drawings consists of a tight shell 11 preferably formed of stainless steel and having a heat refractory and heat insulating lining 12. Placed inside the lining are three regenerative masses 13, 14 and 15. These masses are disposed in T relationship, the two top masses 13 and 14 being in the bar of the T and the third mass 15 being in the stem of the T. The masses 13 and 14 are separated by a combustion space 16 and the third mass 15 is placed below the combustion space 16. All three masses have open channels 17, as shown in Fig. 3, through which gases may pass into or out of the combustion space 16. Three separate end spaces 18, 19 and 20 are provided, each end space being placed inside an extension of said shell in such a position that the gases from the channels 17 in one of said masses may pass into or out of said space. An opening 21 closed by a removable cover 22 is provided in the top of the furnace, to enable a torch to be used to preheat the furnace. Outlet pipes 23, 24 and 25 are provided, one each for each of the end spaces 18, 19 and 20. The furnace is supported on a structural iron framework 26. It is an essential feature of the invention that the masses 13 and 14 are supported on their sides on opposite sides of the combustion space 16 and the mass 15 is below this space 16, because the mass 15 must be supported on its cooler end, which is the lower end. The above described furnace may be used for many purposes but it may be used for the pyrolysis of hydrocarbons if the pipes and valves shown in Fig. 4 are supplied. The valves may be conveniently numbered 30 to 37, inclusive.

Fuel gas is supplied to the pipe 23 through the valve 30 from a fuel gas pipe 41. Air or oxygen may be supplied from an air pipe 42 through the valve 37 to the pipe 25. Off-gas may be taken from the pipe 25 through the valve 36 into the off-gas pipe 43. Off-gas may also be delivered from the pipe 23 through the valve 31 to a pipe 44 and thence to the off-gas pipe 43.

Spent products of combustion may be taken from the pipe 24 through the valve 32 and passed to a stack through a stack pipe 47. A stock gas may be delivered from a pipe 45 through the valve 33 to the pipe 24, and this stock gas may be considered the in-gas for the process, taken alone or mixed with diluent delivered to the pipe 45 through a valve 35 from a pipe 46. In some cases air or oxygen may be mixed with the stock gas with or without diluent, the air or oxygen being delivered to the pipe 45 from a pipe 48 through the valve 34. The in-gas will then consist of stock gas, diluent and air.

An off-gas pump 50 pulls off-gas from the pipe 43 and a stack pump 51 pulls spent products of combustion from the pipe 47. The above arrangement of valves and piping is well adapted to conduct a recurrent cyclic process consisting of a heat step, in which products of combustion are passed downwardly through channels 17 in the third mass 15, and a make step in which an in-gas is passed upwardly through the channels 17.

Prior to starting cyclic operation, the furnace must be preheated which is accomplished as follows: The cover 22 having been removed, the pump 50 is started, the valves 31 and 36 are opened and a burning torch is inserted into the combustion space 16. The products of combustion from the torch are drawn outwardly from the combustion space through the channels 17 in the mass 13 and into the end space 18 from which they are drawn through the pipes 23, 44 and 43 into the pump 50 and wasted to the air. The mass 13 is thus heated and this heating must be continued until the ends of the masses 13 and 14 which abut on the combustion space 16 are heated to a temperature very substantially above reaction temperature, which is hereby defined as the lowest temperature at which the desired reaction of the in-gas will readily occur. The heat is so supplied that the inner ends of the masses are quite hot and the outer ends are much colder. The preheating step is then stopped by withdrawing the torch and putting the cover 22 on the opening 21.

The heat step is then started by opening the valves 30, 37 and 32, the pump 51 being also started. Air is then drawn into the combustion space 16 through the channels 17 in the mass 14 from the end space 20, this air being supplied through the pipe 25 and the valve 37 from the pipe 42. Fuel gas, which may or may not be the stock gas, or which may be a waste by-product gas produced in the process, flows into the combustion space 16 through the channels 17 in the mass 13 from the end space 18, this gas being delivered to the end space 18 through the pipe 23 and valve 30 from the pipe 41. Both the air and fuel gas are delivered at a high temperature and high velocity into the combustion space 16 where they form products of combustion which are drawn downwardly through the channels 17 in the third mass 15 into the end space 19 and from that end space through the pipe 24, the valve 32, and the pipe 47 into the pump 51 from which they are discharged into the stack. During the heat step the masses 13 and 14 give up sensible heat to the air and fuel gas and are themselves cooled and the third mass 15 cools the products of combustion and is heated by these products. At the conclusion of the heat step, the top of the mass 15 will be substantially above reaction temperature, which may be as high as 2600° F., while the bottom of the mass 15 may be at a temperature as low as 400° F. The inner ends of the masses 13 and 14 may be at a temperature even below reaction temperature and the outer ends, due to the cooling action of the air and fuel gas, may be at a temperature as low as 400° F. The heat step is stopped by closing the valves 30 and 37.

The make step is started by opening the valves 33 and perhaps 34 and 35 so as to supply in-gas to the pipe 24. The valves 31 and 36 are opened. The pumps 50 and 51 are continuously running during the cyclic operation and the pump 50 pulls off-gas from each of the end spaces 18 and 20 through the pipes 23 and 25, the valves 31 and 36 and the pipes 44 and 43. This gas is off-gas formed in the central combustion space 16 and cooled in the masses 13 and 14. If air is mixed with the in-gas by opening the valve 34, combustion may occur during the make cycle, but preferably only a diluent such, for example, as steam admitted through the valve 35 is added to the stock gas to form the in-gas. When the make step is so operated without combustion or partial combustion, the heat necessary to produce the desired reaction is supplied wholly by heat previously absorbed by the regenerative masses 13, 14 and 15.

The operation of the process will be better understood from the following examples.

*Example 1.—Propane cracking*

During the heat period, which continued for about one minute, a fuel gas was fed through the mass 13 and more than enough air to entirely burn all the fuel gas was fed through the mass 14. The masses 13 and 14 were heated by the previous heating step and both the air and gas entered the combustion space 16 at a temperature somewhat above 2000° F. The products of combustion, with some excess air and at a temperature somewhat below 3000° F., passed downwardly through the third mass 15 and the heat step was continued until the top of the mass 15 was at a temperature of about 2600° F. The outer ends of the masses 13 and 14 were at a temperature of about 250° F. at the end of the heat step, having been cooled by the entering air and fuel gas.

The in-gas, consisting of propane diluted with four and one-half times (4½) its volume of steam passing up through the channels 17 in the mass 15, was heated to a reaction temperature of about 2200° F. before reaction occurred. The reaction absorbed heat from the regenerative masses and the off-gas formed by the reaction was cooled to about 500° F. as it passed outwardly through the masses 13 and 14.

The off-gas had about the following composition:

| | Per cent |
|---|---|
| $CO_2$ | 0.4 |
| $C_2H_2$ | 14.8 |
| $C_2H_4$ | 15.7 |

| | |
|---|---|
| $C_3H_6$ | 0.9 |
| $C_6H_6$ | 1.1 |
| $O_2$ and $N_2$ | 0.3 |
| $H_2$ | 43.5 |
| CO | 2.7 |
| $CH_4$ | 20.4 |
| $C_2H_6$ | 0.2 |

It will be seen that after the acetylene was withdrawn from the above off-gas, an excellent fuel gas remained. This gas was in excess of the amount needed to supply fuel gas to the pipe 41 and was used to operate gas-driven compressors used in the separation of the acetylene from the off-gas.

Example 2.—Methane cracking

The heat step was continued until the top of the mass 15 was at a temperature above 2800° F. This heat step was otherwise similar to that used for cracking propane except that more gas and air were supplied. The in-gas, consisting of methane diluted with twice its volume of steam, was passed upwardly through the channels 17 in the third mass 15 and heated to a reaction temperature of 2600° F. The off-gas had a temperature where it passed through the pipe 43 of about 400° F. The off-gas had about the following composition:

| | Per cent |
|---|---|
| $C_2H_2$ | 7.8 |
| CO | 8.1 |
| $CO_2$ | 1.1 |
| $CH_4$ | 17.3 |
| $H_2$ | 63.6 |
| $N_2$ | 1.2 |

It will be noted that after the acetylene $C_2H_2$ was taken out of the off-gas, there was a fuel gas consisting predominately of CO, $CH_4$ and $H_2$ which had a high fuel value.

I claim as my invention:

1. A process of producing an off-gas containing a substantial proportion of a desired hydrocarbon from an in-gas containing a substantial proportion of a suitable hydrocarbon, which consists of a preheating step and cyclic process consisting of heat and make steps, said steps being defined as follows: in the preheating step hot gases of combustion are passed from a central combustion space outwardly through channels in a first and a second regenerative mass; in the heat step a fuel gas is passed inwardly through the channels in said first regenerative mass into said central combustion space, air is passed inwardly through the channels in said second regenerative mass into said central combustion space, and the gases of combustion formed by the burning of said fuel with said air in said space are passed through channels in a third regenerative mass; and in the make step the in-gas is passed through said channels in said third regenerative mass into said central combustion space and off-gas from said central combustion space is passed through the channels of either the first or the second regenerative mass.

2. A process as in claim 1 in which the off-gas is passed through the channels in both the first and second regenerative masses.

References Cited in the file of this patent

UNITED STATES PATENTS

| Number | Name | Date |
|---|---|---|
| 1,940,209 | Fischer et al. | Dec. 19, 1933 |
| 2,191,510 | Whitehurst | Feb. 27, 1940 |
| 2,208,123 | Duncan | July 16, 1940 |
| 2,319,679 | Hasche et al. | May 18, 1943 |
| 2,421,744 | Daniels et al. | June 10, 1947 |
| 2,432,885 | Hasche | Dec. 16, 1947 |
| 2,491,518 | Riblett | Dec. 20, 1949 |
| 2,518,688 | Hasche | Aug. 15, 1950 |

FOREIGN PATENTS

| Number | Country | Date |
|---|---|---|
| 572,893 | Germany | Mar. 25, 1933 |